(12) United States Patent
Brune

(10) Patent No.: US 9,817,141 B2
(45) Date of Patent: Nov. 14, 2017

(54) METHOD TO SEPARATE COMPRESSIONAL AND SHEAR WAVES DURING SEISMIC MONITORING BY UTILIZING LINEAR AND ROTATIONAL MULTI-COMPONENT SENSORS IN ARRAYS OF SHALLOW MONITORING WELLS

(75) Inventor: Robert H. Brune, Evergreen, CO (US)

(73) Assignee: Geokinetics USA, Inc., Houston, TX (US)

( * ) Notice: Subject to any disclaimer, the term of this patent is extended or adjusted under 35 U.S.C. 154(b) by 498 days.

(21) Appl. No.: 14/006,105

(22) PCT Filed: Mar. 21, 2012

(86) PCT No.: PCT/US2012/029907
§ 371 (c)(1),
(2), (4) Date: Sep. 19, 2013

(87) PCT Pub. No.: WO2012/129277
PCT Pub. Date: Sep. 27, 2012

(65) Prior Publication Data
US 2014/0010046 A1    Jan. 9, 2014

Related U.S. Application Data

(60) Provisional application No. 61/454,573, filed on Mar. 21, 2011.

(51) Int. Cl.
G01V 1/28    (2006.01)
E21B 43/26   (2006.01)
G01V 1/30    (2006.01)

(52) U.S. Cl.
CPC .............. G01V 1/284 (2013.01); E21B 43/26 (2013.01); G01V 1/308 (2013.01); G01V 2210/1234 (2013.01); G01V 2210/144 (2013.01)

(58) Field of Classification Search
CPC ................. G01V 1/284; G01V 1/308; G01V 2210/1234; G01V 2210/144; E21B 43/26
USPC .......................................................... 367/75
See application file for complete search history.

(56) References Cited

U.S. PATENT DOCUMENTS

| | | | | |
|---|---|---|---|---|
| 5,946,271 A | * | 8/1999 | Dragoset, Jr. | G01V 1/306 367/13 |
| 7,069,990 B1 | * | 7/2006 | Bilak | B09B 1/008 166/268 |
| 2009/0299637 A1 | * | 12/2009 | Dasgupta | G01V 1/008 702/12 |

(Continued)

*Primary Examiner* — Daniel L Murphy
(74) *Attorney, Agent, or Firm* — Karen B. Tripp

(57) ABSTRACT

The present invention provides a technique to separate compressional seismic waves from shear seismic waves and to determine their direction of propagation to enhance the seismic monitoring oil and gas reservoirs and the seismic monitoring of hydrofracturing in oil and gas wells. The invention utilizes various combinations of multi-component linear seismic sensors, multi-component rotational seismic sensors, and pressure sensors. Sensors are jointly deployed in arrays of shallow monitoring wells to avoid the complicating effects of the free surface of the earth. The emplacement of sensors in the shallow monitoring wells may be permanent. The method has a wide range of application in oil and gas exploration and production. This abstract is not intended to be used to interpret or limit the claims of this invention.

10 Claims, 3 Drawing Sheets

(56) References Cited

U.S. PATENT DOCUMENTS

2010/0139927 A1* 6/2010 Bakulin ............... G01V 1/36
166/369
2010/0231919 A1* 9/2010 Schreiber ............ G01M 5/0091
356/460

* cited by examiner

METHOD TO SEPARATE COMPRESSIONAL AND SHEAR WAVES DURING SEISMIC MONITORING BY UTILIZING LINEAR AND ROTATIONAL MULTI-COMPONENT SENSORS IN ARRAYS OF SHALLOW MONITORING WELLS

RELATED APPLICATIONS

The present application claims priority from U.S. Provisional Patent Application No. 61/454,573, filed Mar. 21, 2011.

FIELD OF THE INVENTION

The present invention pertains to the art of seismic surveying to monitor petroleum reservoirs, and more specifically to the joint use of linear sensors, rotational sensors, and pressure sensors in arrays of shallow monitoring wells to enhance the active seismic source and passive seismic monitoring of oil and gas field reservoirs, and the passive seismic monitoring of hydrofracturing of oil and gas wells.

BACKGROUND OF THE INVENTION

There is a long term trend of increasing interest in active and passive seismic monitoring in and around oil and gas fields. For a summary, see, for example, Weijers, L. *Advanced Fracture Methods and Mapping*, Soc. Petroleum Engineers training course (2005). The recording of seismic data on the surface of the earth, in arrays of shallow wells, and in deep boreholes has been utilized. The discrimination of compressional waves from shear waves is an integral part of applications to determine rock and fluid properties. In the monitoring of hydrofracturing of producing oil and gas wells, it can be useful to be able to discriminate between compressional and shear waves.

Techniques such as described in U.S. Pat. No. 5,774,419 are used to detect seismic arrival events from background noise. Techniques such as described in U.S. Pat. No. 7,663,970 are utilized to locate seismic source events. Techniques such as described in U.S. Pat. No. 7,660,194 B2 are used to refine the seismic velocity field to enhance the location of seismic source events. Techniques such as described in U.S. Pat. No. 7,590,491 B2 are used to passively monitor production of fluids from reservoirs.

Techniques for 3D and 4D seismic surveys of oil and gas fields using arrays of sensors and active seismic sources deployed on the surface are well established in commercial practice. Also, in recent practice, permanent deployments of 3C linear sensors and pressure sensors in arrays of shallow monitoring wells have become a common commercial practice over selected oil and gas fields. These deployments are used for active monitoring utilizing active seismic sources; and for passive monitoring to detect natural seismic events that may in turn be due to movement of fluids, hydrofracturing, or the like.

Techniques have been devised to attempt to separate compressional and shear waves in the processing of multi-component linear motion data. These include many various well established seismic signal and image processing techniques, as well as wave propagation based processing, such as, for example that described in Sun, R. et al., Separating P- and S-waves in prestack 3D elastic seismograms using divergence and curl, Geophysics, vol. 69, no. 1, pp. 286-297 (2004).

It is well understood in many fields of physical science and engineering that a complete representation of mechanical motion requires the measurement of six degrees-of-freedom. Typically this is accomplished by measuring three orthogonal linear motions, and measuring rotations around three orthogonal axes.

There is a well established technology for measurement of the linear particle motion of seismic wavefields in the earth. Many commercial sensors exist to measure particle velocity or particle acceleration along one, or up to three, linear axes, utilizing various physical concepts to accomplish the measurements. It is most common to utilize measurements of the vertical particle motion.

There is an evolving commercial technology for measurement of the rotational particle motion of seismic wavefields in the earth. Early technology is represented by, for example, U.S. Pat. No. 3,407,305 and U.S. Pat. No. 4,603,407. Newer technology is represented by, for example, sensors such as those commercially offered by MetTech (model Metr-3), June, 2010, http://www.mettechnology.com/ and Eentec (models R-1 and R-2), June 2010, http://www.eentec.com/R-s_data_new.htm. U.S. Pat. No. 7,516,660 B2 describes MetTech sensor technology. U.S. Pat. No. 7,474,591 B2 describes technology to measure rotational data from differences of linear data.

Seismic rotational motion is commonly understood to be the vector curl of the infinitesimal displacement field. The existing rotational sensors are understood to measure the components of this vector curl.

The utility of rotational seismic measurements is appreciated in earthquake and regional crustal seismology, as discussed, for example, in Lee, W., et. al., Rotational Seismology and Engineering Applications, Bull. Seismological Society of America, vol. 99, no. 2B, supplement (May 2009).

The free surface of the earth adds a significant complicating effect to the separation of compressional waves from shear waves. This is largely due to conversion between compressional and shear waves at the free surface.

Elastic seismic wave theory is well understood, particularly for a linear homogeneous isotropic earth. The surface of the earth is approximately a stress free surface. The effect of the free surface on elastic waves is well understood, as described in technical references such as Aki, K. and Richards, P., *Quantitative Seismology*, University Science Books (2002) or Stein, S. & Wysession, M., *An Introduction to Seismology, Earthquakes, and Earth Structures*, Blackwell Publishing (2003).

Prior art for separation of compressional and shear waves includes U.S. Pat. No. 2,657,373 which utilizes horizontal phase velocity as an input parameter.

Prior art to determine the direction of propagation of compressional waves includes utilizing a pressure sensor and a vector component of linear motion in the direction of the propagation. This is commonly used, as for example, in the recording and processing of Ocean Bottom Seismic (OBS) data.

Prior art to determine direction of propagation of known shear waves includes U.S. Pat. No. 4,446,541 which is applicable at a depth away from the free surface. This utilizes a combination of one linear motion vector component and one rotational vector component, both said vector components being orthogonal to the direction of propagation, and to each other.

OBJECT OF THE INVENTION

The object of the present invention is to improve the ability to separate compressional (P) and shear (S) seismic waves, and to enhance the determination of their propagation direction, by using a novel combination and deployment of rotational motion sensors, linear motion sensors, and pressure sensors, in an array of shallow monitoring wells, to yield a more complete description of seismic particle motion with minimal deleterious effects of the near surface.

SUMMARY OF THE INVENTION

The invention includes, in its many aspects and embodiments, a method to enhance the discrimination of compressional waves and shear waves in seismic data recorded by sensors located below the free surface of the earth in shallow monitoring wells. More particularly, the method comprises: recording the linear particle motion, preferably in three orthogonal directions at each sensor location; recording the rotational motion, preferably around three orthogonal axes at each sensor location; recording pressure at each sensor location; and utilizing the combination of the linear motion, rotational motion, and pressure to separate signals due to compressional and shear waves.

DETAILED DESCRIPTION OF THE INVENTION

Figure 1:
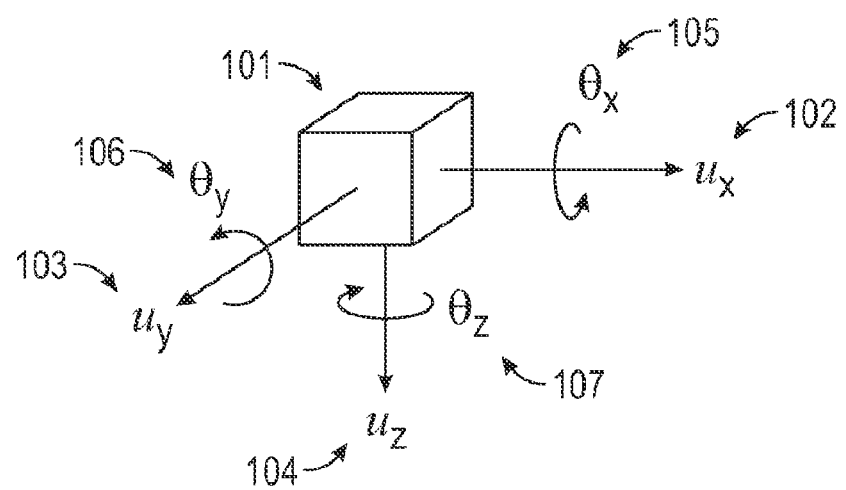
FIG. 1 is a diagrammatic view of the linear motion and rotational motion of a representative elemental volume of the earth.

The particle motion of a representative elemental volume 101 of the earth is as depicted in FIG. 1. A Cartesian coordinate system is utilized, but those skilled in the art will recognize that various alternate equivalent coordinate systems and representations of particle motion may be utilized. The complete particle motion is comprised of three linear motions, 102-104, and three rotational motions, 105-107. A right-hand rule for axes and rotation sign conventions is arbitrarily chosen for use throughout the description of the present invention.

Rotational seismic data measured by rotational seismic motion sensors may be directly related to the vector curl of the displacement wavefield, $\underline{u}$, often with a factor of ½. Alternatively, measurements may be made of the time derivative of this rotational displacement which is angular velocity, also known as the angular rate, as is done in some commercially available rotational seismic sensors; or of the second time derivative of this rotational displacement which is angular acceleration. It will be understood by those skilled in the art that the use of various time derivatives does not affect the present invention so long as the same time derivative is consistently utilized for both the linear and rotational motion measurements.

Figure 2:
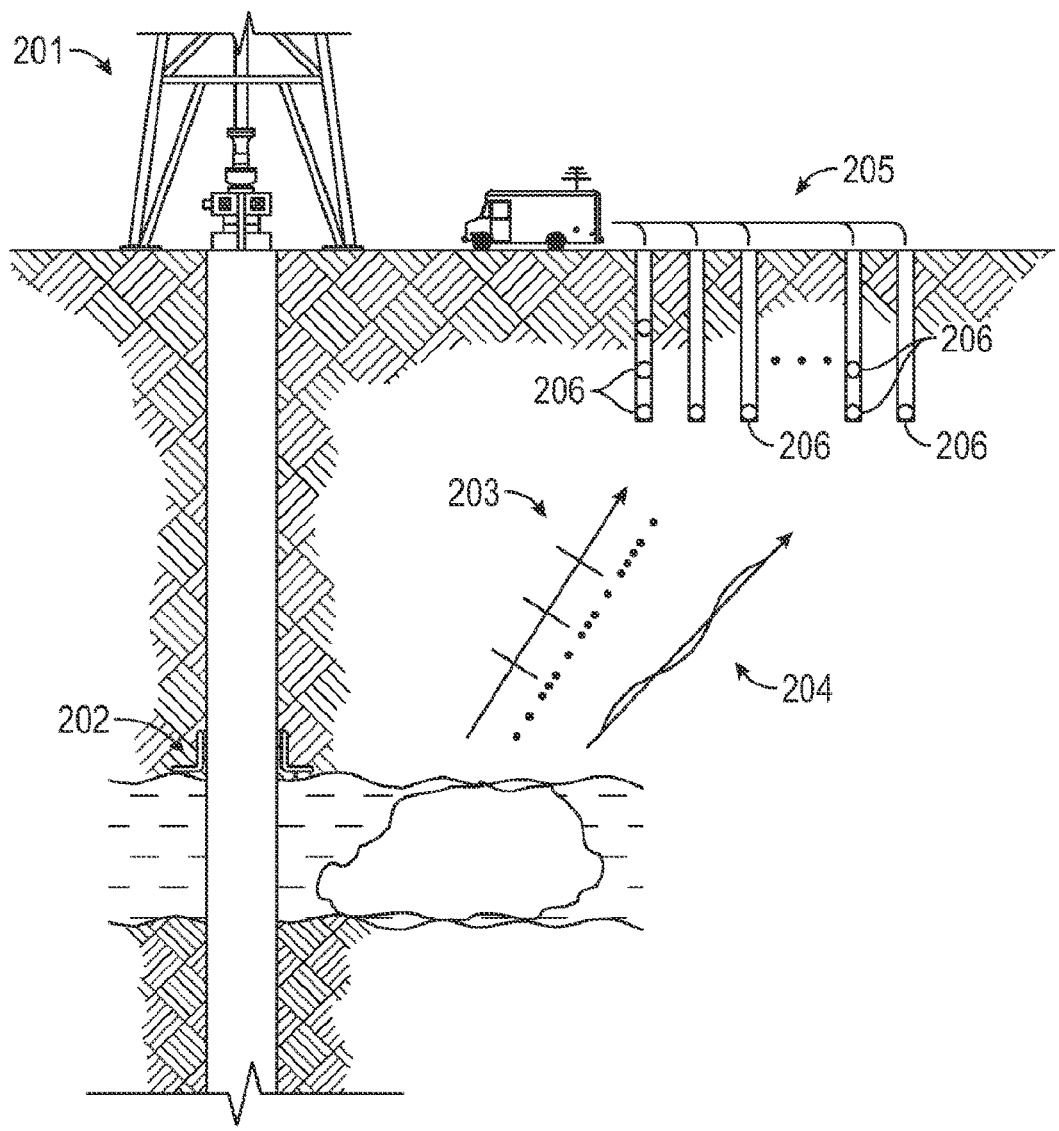
FIG. 2 is a diagrammatic view of oil and gas production, or of a hydrofracturing project, for a reservoir at a particular depth, along with seismic monitoring in an array of shallow monitoring wells utilizing multi-component rotational sensors, multi-component linear sensors, and pressure sensors.

FIG. 2 diagrammatically shows a configuration in the field for recording data. Typically there will be one or more oil and/or gas wells 201 penetrating a target reservoir or zone of interest 202. Compressional 203 and shear 204 seismic waves will be transmitted upwards. Said seismic waves may conceptually be due to one or more causes. These waves may include reflections of energy emitted by an active source; or may be emitted due to induced hydrofracturing around the well 201; or may be due to fluid flow during production of the reservoir 202.

Those skilled in the art will appreciate that the compressional 203 and shear 204 waves depicted in FIG. 2 may possibly include some or all of the various forms of elastic seismic energy that are possible in the earth, including body waves, converted waves, various up and/or down going waves, multiply reflected waves, waves in wave guides, surface attached modes of propagation, and dispersed waves.

There typically will be an array of shallow monitoring wells 205 located in a region around the well 201 and geologic target of interest 202. There typically will be one or more sensor deployment locations 206 at one or more depths in the shallow monitoring wells.

Each sensor deployment location 206 will typically include up to three Cartesian linear motion sensors, up to three Cartesian rotational motion sensors; and a pressure measurement sensor. This sensor configuration at a sensor deployment location may be referred to as a seven-component sensor.

The use of the present novel combination and deployment of rotational, linear, and pressure sensors allows for the separation of compressional (P) waves from shear (S) waves, as well as for the determination of direction for each wave.

Consider the homogeneous isotropic equation of motion for a linear elastic continuum away from any boundaries such as the free surface (e.g., Aki & Richards, p. 35; or Stein & Wysessions, 2003, eq. (10), p. 53):

$$\rho \underline{\ddot{u}} = (\lambda + \mu)\nabla(\nabla \cdot \underline{u}) + \mu \nabla^2 \underline{u} \tag{1}$$

where:
ρ is the density
$\underline{u}$ is the particle displacement vector; and double dots represent second time derivative
λ is the first Lame constant
μ is the second Lame constant, or shear modulus
∇ is the vector Del operator Those skilled in the art will recognize that we may now successively take the vector divergence and vector curl of this equation (1) to separate the infinitesimal displacement, $\underline{u}$, into compressional waves at compressional wave velocity, and into shear waves at shear wave velocity.

First, take the divergence of equation (1) and interchange the order of some operations to see that:

$$\rho(\nabla \cdot \underline{\ddot{u}}) = (\lambda + \mu)\nabla \cdot \nabla(\nabla \cdot \underline{u}) + \mu \nabla^2(\nabla \cdot \underline{u}) \tag{2}$$

Note that the dilation, θ, is defined as:

$$\theta \equiv \nabla \cdot \underline{u} \equiv e_{xx} + e_{yy} + e_{zz} \equiv \frac{\partial u}{\partial x} + \frac{\partial v}{\partial y} + \frac{\partial w}{\partial z} \tag{3}$$

where e's are components of the linear strain tensor, and u, v, w are the vector components of the displacement vector. Utilizing equation (3) in equation (2) it is seen that:

$$\rho \ddot{\theta} = (\lambda + 2\mu)\nabla^2 \theta \tag{4}$$

which is recognized as a scalar wave equation for dilation, θ, traveling with compressional wave velocity, $v_p$, given as:

$$v_p = \sqrt{\frac{\lambda + 2\mu}{\rho}} \quad (5)$$

Thus a sensor that detects dilation will selectively detect waves traveling at the compressional wave velocity. This is as described by equations (3), (4), and (5).

Second, take the curl of equation (1), interchange the order of some operations, and note that the curl of a grad vanishes to see that:

$$\rho \partial_{tt}(\nabla \times \underline{u}) = \mu \nabla^2(\nabla \times \underline{u}) \quad (6)$$

which is recognized as a vector wave equation for the rotational seismic signal which is the vector curl of displacement, $$(\nabla \times \underline{u}) \equiv \begin{bmatrix} 0 & -\partial_z & \partial_y \\ \partial_z & 0 & -\partial_x \\ -\partial_y & \partial_x & 0 \end{bmatrix} \begin{bmatrix} u \\ v \\ w \end{bmatrix} \quad (7)$$

traveling with shear wave velocity, $v_s$, given as:

$$v_s = \sqrt{\frac{\mu}{\rho}} \quad (8)$$

Thus a sensor that detects rotation, which is related to curl of displacement, will selectively detect waves traveling at the shear wave velocity. This is as described by equations (6), (7), and (8).

In general, the pressure signal will be non-zero for compressional waves; and zero for shear waves.

In general, the rotational signals will be zero for compressional waves; and non-zero for shear waves.

In general, the components, u, v, w of the linear displacement vector will be non-zero for both compressional and shear waves.

Those skilled in the art will recognize that there may be many complications in the seismic signals measured within any particular shallow monitoring well. These complications can depend on many factors, including but not limited to variations in elastic parameters and density around the shallow monitoring well; whether the shallow monitoring well is cased; whether it is cemented; how the sensors are coupled to the wall of the shallow monitoring well; whether the shallow monitoring well is filled with air, brine, sand, gravel, cement, or other material. Additionally there may be other modes of seismic wave propagation detected, including but not limited to tube waves, Rayleigh waves detected at depth, and potentially other waves.

Figure 3:
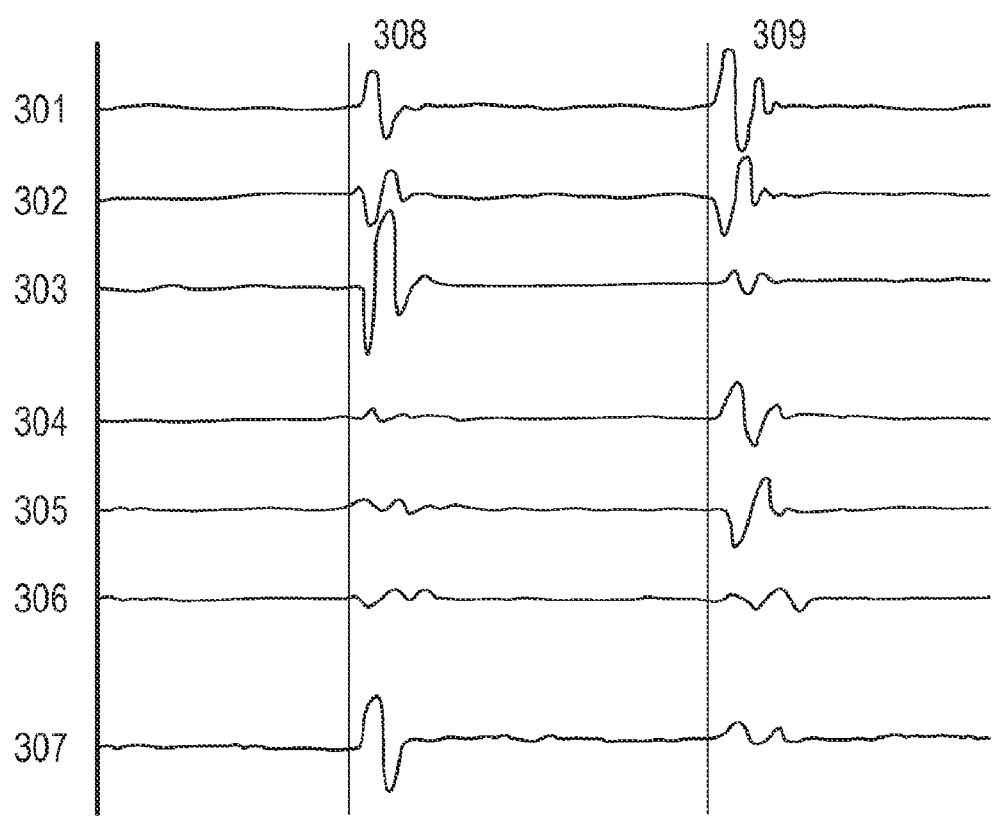
FIG. 3 is a diagrammatic representation of the seismic signals for one conceptual seismic event, either reflected from the reservoir zone of interest, or seismically activated in and near the reservoir zone of interest, depicting the compressional and shear seismic waves on multi-component rotational sensors, multi-component linear sensors, and a pressure sensor, all of said sensors being co-located.

FIG. 3 shows typical expected signals from the several sensors at one sensor deployment location 206 for a compressional 308 wave and a shear 309 wave. Linear motion is typically sensed by particle velocity or particle acceleration sensors. Up to three Cartesian linear motion components are typically recorded as depicted by traces 301-303. Rotational motion is typically sensed as angular velocity or angular acceleration. Up to three Cartesian rotational motion components are typically recorded as depicted by traces 304-306. Pressure is typically recorded from a hydrophone as depicted by trace 307. It is noted that there are characteristic variations in each of these seven-components that characterize compressional 308 vs. shear 309 wave arrivals. All prior art in signal processing and wavefield processing of seismic data may be utilized as necessary to enhanced desired signals. Those skilled in the art will appreciate that wavelet shapes and phases shown in FIG. 3 are diagrammatic only and will vary depending on many factors.

The effect of the free surface is such as to typically cause the conversion between compressional waves and shear waves. This conversion effect complicates the ability to separate compressional waves and shear waves. Corrections for these effects can be utilized in data processing as described, for example, in Aki & Richards (2002), particularly pp. 184-185. However, these free surface corrections are dependent upon knowledge of near surface velocities and upon a relatively homogeneous nature for the near surface. This may not be a typical situation because it is commonly understood that near surface geology can be particularly variable. Deployment of sensors in shallow monitoring wells offers a direct mechanism to avoid the deleterious effects of the free surface and variable near surface geology.

Those skilled in the art will recognize the novelty of the concepts engendered in recording the combination of rotational, linear, and pressure data in a deployment away from the free surface of the earth in an array of shallow monitoring wells. Dilational energy described in equation (3) propagates as governed by equation (4) at a compressional velocity given by equation (5). It is preferentially detected by pressure and linear motion sensors. The curl wavefield described in equation (7) propagates as governed by equation (6) at a shear velocity given by equation (8). It is preferentially detected by rotational and linear motion sensors.

The deployment of the rotational, linear, and pressure sensors in an array of shallow monitoring wells also often has additional advantages which are not part of the present invention. Deployment in a shallow monitoring well can lower the seismic noise levels below those experienced at the free surface. Also, deployment in shallow monitoring wells below the water table allows for the more effective use of pressure sensors.

Deployment of rotational, linear, and pressure sensors in shallow monitoring wells may often be advantageously done with sensors at several depth levels. Deployment of sensors at multiple levels allows for additional processing of the data. For example, compressional vs. shear waves may be separated; and upgoing vs. downgoing waves may be separated by well known techniques such as those commonly commercially used in Vertical Seismic Profiles, or as described, for example, in U.S. Pat. No. 4,446,541.

In a preferred embodiment, there typically may be an array of shallow monitoring wells spaced more or less regularly at intervals on the order of several hundred meters horizontally apart, covering an area that extends horizontally a distance that is the same order of magnitude as the depths of interest for the reservoir or geologic target to be monitored. The shallow monitoring wells may typically be of a depth of at least a few meters, up to a depth of a few hundred meters. The preferred embodiment may utilize an array of wells on the order of 100 meters deep, with sensor deployment locations 206 typically at depths of 25 m, 50, 75 m, and 100 m. Each sensor deployment location 206 typically will sense three components of linear motion, three components of rotational motion, and pressure. The shallow monitoring wells may typically be filled with sand, drilling cuttings, and/or small gravel; and be saturated with brine or water. Said deployment is considered permanent. Said deployment may be used for multiple purposes, including 3D and 4D seismic with active seismic sources; passive monitoring of hydrofracturing of oil and gas wells; and/or passive monitoring of fluid flow in reservoirs.

In another embodiment, the seven component sensors may be deployed in brine or water filled shallow monitoring wells, and coupled to the wall of these shallow wells with temporarily deployable locking arms. Said deployment is intended to be retrievable and is considered non-permanent.

In another embodiment the deployment of the array of shallow monitoring wells will utilize a geometry suitable for location of fractures induced by hydrofracturing. Said geometry shall include shallow monitoring wells at various azimuths and various distances from the deep oil and gas well being hydrofractured. This embodiment may utilize the detection of both compressional and shear waves, and may possibly utilize t-s and t-p arrival times to solve for the distance from the sensor to the fractures of the seismic source. T-s and t-p are understood to be the arrival times for compressional (P) and shear (S) waves, both emanating from the same seismic event or source.

In another embodiment the deployment of the shallow monitoring wells will utilize a geometry suitable for determination of double couple shear seismic source mechanism as is commonly understood in earthquake seismology. Said geometry shall include shallow monitoring wells at various azimuths, and may include relatively longer horizontal distances from the reservoir zone of interest. This embodiment may ideally benefit from detection and separation of both compressional and shear waves at all azimuths horizontally from the geologic target of interest, such as to enhance the determination of any radiation patterns.

In another embodiment the deployment of the shallow monitoring wells will utilize a geometry suitable to analyze the polarization of three-component linear motion measurements, using techniques that are well known. These techniques may be used, for example, to determine the direction of arrival of compressional seismic waves, and thus to determine to location of the seismic event by utilizing sensor deployments at multiple locations.

The above three embodiments: utilizing t-p and t-s arrival times to determine distances to seismic source events; utilizing the analysis of shear double couple source mechanisms; and utilizing the determination of compressional wave arrival direction; all require, or benefit from, the use of three or more shallow monitoring wells. The locations of the three or more shallow monitoring wells may be optimized based on various attributes such as azimuth and horizontal distance from subsurface areas of interest.

A limited number of embodiments have been described herein. Those skilled in the art will recognize other embodiments within the scope of the claims of the present invention.

What is claimed is:

1. A method to enhance the separation of compressional from shear seismic waves, and to enhance the determination of the direction of propagation of both compressional and shear waves, comprising:
    a. utilizing one or more linear sensors, one or more rotational sensors, and one or more pressure sensors;
    b. deploying said sensors at one or more depths in one or more shallow monitoring wells;
    c. processing various combinations of the linear, rotational, and/or pressure data jointly such as to enhance the separation of compressional and shear seismic waves, and to enhance the determination of their directions of propagation.

2. The method in of claim 1 wherein a pressure sensor is not deployed at each sensing location.

3. The method of claim 1 wherein sensors are deployed at only one depth in the shallow monitoring wells.

4. The method of claim 1 wherein rotational motion is only recorded about two independently oriented horizontal axes.

5. The method of claim 1 wherein data are recorded multiple times utilizing an active seismic source, with a time lapse such as to constitute a 4D or time lapse seismic survey.

6. The method of claim 1 wherein data are recorded to passively monitor the hydrofracturing of oil and gas wells.

7. The method of claim 1 wherein data are recorded to passively monitor seismic emissions while oil and gas are produced.

8. The method of claim 1 wherein data are recorded in three or more shallow monitoring wells.

9. The method of claim 1 wherein the deployment of sensors in the shallow monitoring wells is permanent.

10. The method of claim 1 wherein the deployment of sensors in the shallow monitoring wells is non-permanent.

* * * * *